H. H. DAVIS.
SAFETY CRANK.
APPLICATION FILED APR. 7, 1919.
1,345,142.
Patented June 29, 1920.
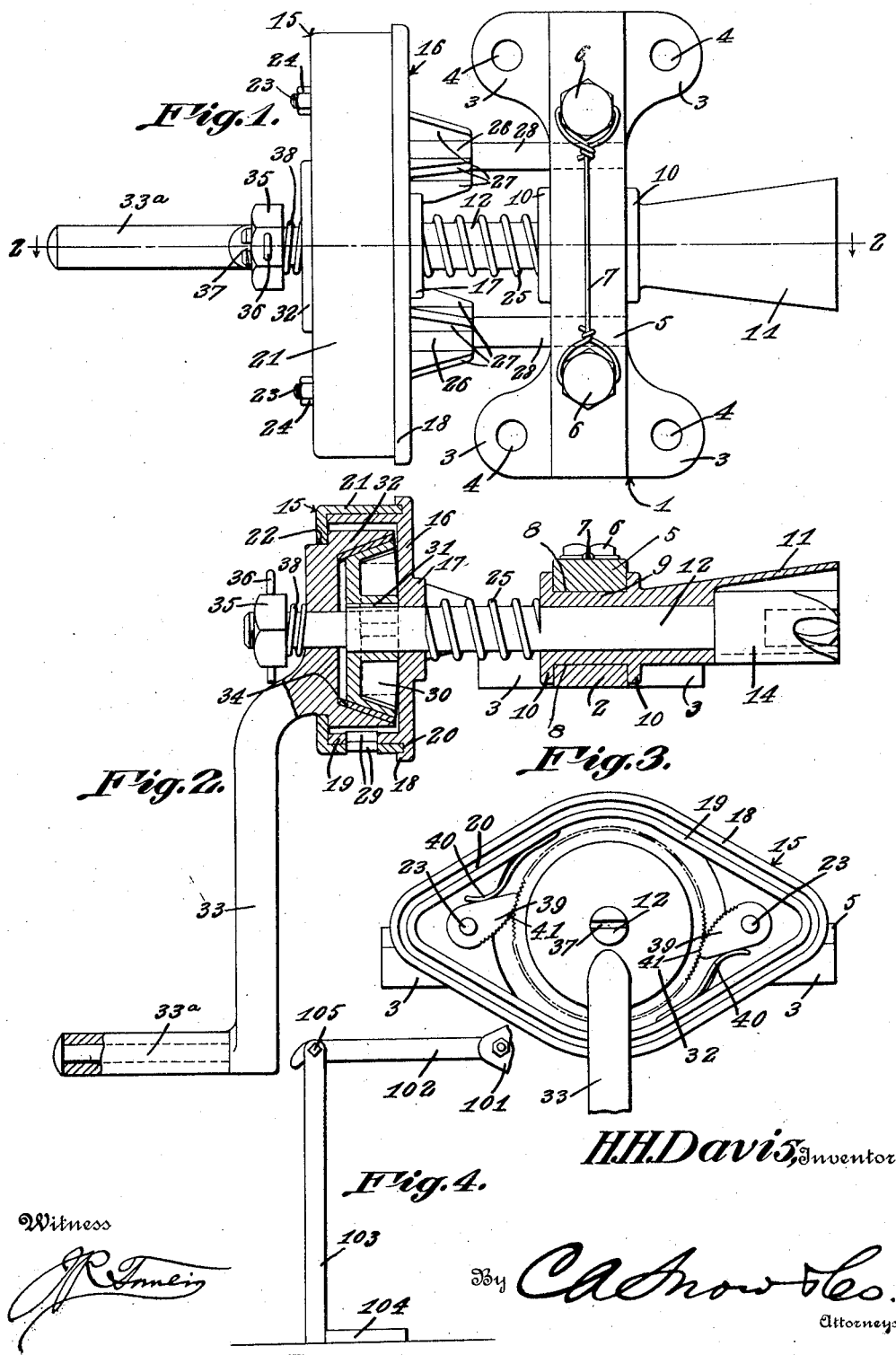

UNITED STATES PATENT OFFICE.

HARRISON H. DAVIS, OF THE PLAINS, OHIO.

SAFETY-CRANK.

1,345,142.   Specification of Letters Patent.   Patented June 29, 1920.

Application filed April 7, 1919. Serial No. 288,176.

*To all whom it may concern:*

Be it known that I, HARRISON H. DAVIS, a citizen of the United States, residing at The Plains, in the county of Athens and State of Ohio, have invented a new and useful Safety-Crank, of which the following is a specification.

It is the object of this invention to provide novel means whereby the shaft of an internal combustion engine on an automobile may be rotated, for the purpose of starting the engine.

The invention aims to provide novel means whereby the shaft, which is moved inwardly to engage with the engine shaft, is slidably mounted. Another object of the invention is to provide novel means for holding against rotation, the clutch casing which is mounted on the shaft.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:

Figure 1 shows in top plan, a device constructed in accordance with the invention; Fig. 2 is a vertical section wherein parts appear in elevation, the line 2—2 in Fig. 1 indicating the plane on which Fig. 2 is taken; Fig. 3 is a front elevation, a portion of the casing being removed; and Fig. 4 is a fragmental elevation showing a modification.

The numeral 1 indicates a carrier which may be variously constructed. The carrier 1 may be a part of the vehicle frame if desired, but, as delineated in the drawings, the carrier includes a base 2 having wings 3 provided with holes 4 adapted to receive securing devices, whereby the carrier may be connected to the frame of a motor propelled vehicle. The carrier includes a cap 5 superposed on the base 2 and connected therewith by screws 6 or other attaching elements, the heads of the screws being united by a locking device 7, to prevent a rotation of the screws, accidentally. The base 2 and the cap 5 are supplied with coöperating openings 8 wherein a bearing 9 is located. The cap 5 constitutes a clamp adapted to hold the carrier 1 on the bearing, it being obvious that when the screws 6 are tightened down, the carrier 1 will be held on the bearing as aforesaid. The bearing 9 is supplied with flanges 10 coöperating with the front and rear faces of the base 2 and the cap 5. At its rear end the bearing 9 carries a hood 11 of inverted trough shape. The bearing 9 and the hood 11 ordinarily form part of the crank case of the engine.

A shaft 12 is journaled for rotation in the bearing 9 and is supplied at its rear end with a grip 14 adapted to coöperate with the shaft of an internal combustion engine; when the shaft 12 is slid rearwardly in a manner to be described hereinafter. The numeral 15 denotes, generally, a casing, including a back 16 having a hub 17 wherein the shaft 12 is mounted to rotate. The back 16 of the casing 15 has a relatively short outer flange 18, and a longer flange 19, the flanges 18 and 19 defining a groove 20 wherein is received the rear edge of an outer member 21, constituting a part of the casing 15. In the front wall of the outer member 21 there is an opening 22. The flange 19 and the side wall of the outer member 21 are supplied, in their lower portions, with coöperating openings 29 permitting the exit of grease and other foreign matter. The back 16 of the casing 15 is provided with forwardly presented studs 23 on which nuts 24 are mounted, the nuts coöperating with the forward wall of the outer member 21, of the casing 15 to maintain the rear edge of the outer member seated in the groove 20. A compression spring 25 surrounds a portion of the shaft 12 and abuts at its ends against the hub 17 of the casing, and against the forward end of the bearing 9. The back 16 of the casing 15 is provided with sockets 26 reinforced by radial flanges 27. Pins 28 are fixed in the sockets 26 and are slidably mounted in the base 2 of the support 1.

A clutch member 30, preferably of conical form, is located within the casing 15 and is splined as shown at 31, to the shaft 12. The clutch member 30 operates in a recess formed in a clutch member 32 journaled in the opening 22. The clutch member 32 may be rotated in any desired way. The clutch member 32 may be turned, if desired, by means of a crank 33, having a rotatable hand-grip 33ª although any other suitable instrumentality for the purpose specified, may be provided. A friction element 34 is interposed between the periphery of the clutch member 30 and the side wall of the recess in the clutch member 32. The friction element, however, may be located as desired. A nut 35 is threaded on the outer end of the shaft 12 and is held in place by a cotter pin 36 received in a slot 37 formed in the forward end of the shaft 12. A compression spring 38 is interposed between the nut 35 and the clutch member 32 and is carried by the forward end of the shaft 12. The spring 38 coöperating with the member 32 causes the latter to coact with the member 30 to form a clutch.

Pawls 39 are located within the casing 15 and are pivoted on the studs 23, the pawls 39 being constrained by means of springs 40 to coöperate with the periphery of the clutch member 32, the pawls and the periphery of the said clutch member preferably being toothed, as indicated at 41. The springs 40 may be in the form of tongues, one end of each tongue bearing upon the corresponding pawl 39, and the other end of each pawl being attached to the inner flange 19 of the casing.

In practical operation, the shaft 12 is pushed rearwardly until the grip 14 coacts with the shaft of the internal combustion engine, the spring 25 being compressed, and the pins 28 sliding rearwardly in the base 2 of the carrier 1. When rotation is imparted to the clutch member 32 by means of the crank 33 or otherwise, rotation will be imparted to the shaft 12 through the instrumentality of the clutch member 32, and the clutch member 30 which is splined at 31 to the shaft 12. In this way, the shaft of the internal combustion engine may be rotated. Should the engine backfire, then the pawls 39 will prevent a retrograde rotation of the clutch member 32, the clutch member 30 rotating with the shaft 12, the frictional engagement between the clutch members 30 and 32 being overcome.

When the inward thrust on the shaft 12 is relieved, the spring 25 will react and restore the parts to the position indicated in Fig. 2, the inner end of the grip 14 abutting against the end of the bearing 9. The pressure with which the clutch member 30 coöperates with the clutch member 32 may be adjusted by varying the compressive effort of the spring 38, this result being accomplished by adjusting the nut 35, the nut being held in adjusted positions by the cotter pin 36 which is received in the slot 37 of the shaft 12.

It is not necessary that the pins 28 be employed. The pins may be used or omitted, depending upon the make of the automobile wherewith the device forming the subject matter of this application is assembled. Thus, in Fig. 4, the casing 101 is shown as provided with an arm 102 to which a prop 103 is pivoted at 105, the prop including a foot plate 104. The foot of the operator may be placed on the plate 104 to hold the same on the ground, the casing 101 thus being held against rotation. When the occasion for the use of the prop 103 has passed, the prop may be swung upwardly on its pivotal mounting 105 and be held by any suitable means (not shown) in an out of the way position.

The device shown in Fig. 4 of the drawings is intended to be used in connection with cranks which are detachable. The structure is attached to the machine only while the cranking operation is going on.

Having thus described the invention, what is claimed is:—

In a starter for internal combustion engines, a carrier; a shaft journaled in the carrier and slidable longitudinally therein, the shaft being provided at its rear end with a grip; a casing wherein the shaft is journaled; rearwardly projecting pins carried by the casing and slidable longitudinally in the carrier; a clutch in the casing and comprising coöperating parts, one of which is secured to shaft; and means for rotating the other part of the clutch.

In testimony that I claim the foregoing as my own, I have hereto affixed my signature in the presence of two witnesses.

HARRISON H. DAVIS.

Witnesses:
  JOHN J. WOOLLEY,
  O. F. ROWLAND.